United States Patent [19]
Shibuya

[11] Patent Number: 5,999,951
[45] Date of Patent: Dec. 7, 1999

[54] KANA-TO-KANJI CONVERSION METHOD INCLUDING ROMAJI INPUT AND TRANSLATION PROCESSING BY A SERVER

[75] Inventor: Makoto Shibuya, Tokyo, Japan

[73] Assignee: Justsystem Corporation, Tokushima, Japan

[21] Appl. No.: 08/998,758

[22] Filed: Dec. 29, 1997

[30] Foreign Application Priority Data

Jul. 4, 1997 [JP] Japan ................................. 9-179628

[51] Int. Cl.⁶ ..................................................... B41J 5/30
[52] U.S. Cl. ......................... 707/536; 707/534; 707/535; 707/537
[58] Field of Search ................. 707/535, 534, 707/537, 536

[56] References Cited

U.S. PATENT DOCUMENTS

| | | | |
|---|---|---|---|
| 5,321,801 | 6/1994 | Ando | 707/535 |
| 5,659,772 | 8/1997 | Oyamada | 707/535 |
| 5,713,033 | 1/1998 | Sado | 707/534 |

FOREIGN PATENT DOCUMENTS

| | | |
|---|---|---|
| 6-274433 | 9/1994 | Japan . |
| 06282515 | 10/1994 | Japan . |
| 06325037 | 11/1994 | Japan . |
| 07085025 | 3/1995 | Japan . |
| 07152685 | 6/1995 | Japan . |
| 8-263474 | 10/1996 | Japan . |

*Primary Examiner*—Wayne Amsbury
*Assistant Examiner*—Mark Terry
*Attorney, Agent, or Firm*—Sughrue, Mion, Zinn, Macpeak & Seas, PLLC

[57] ABSTRACT

A kana-to-kanji conversion system, in which an input character string is displayed in Romaji in the order in which the characters are inputted in a client on a network, the input character string in Romaji is transmitted successively from the client to a server, a kana character string is obtained by processing the successively transmitted input character string in the server, the kana character string is returned to the originator client from the server, and, of the displayed Romaji in the client, a display of a section corresponding to the returned kana character string is changed to the kana character string.

17 Claims, 9 Drawing Sheets

KANA-TO-KANJI CONVERSION METHOD INCLUDING ROMAJI INPUT AND TRANSLATION PROCESSING BY A SERVER

FIELD OF THE INVENTION

The present invention relates to a kana (Japanese characters)-to-kanji(Chinese characters) conversion system as well as a kana-to-kanji conversion method for converting kana to kanji on a network in which a server is connected to one or a plurality of clients, a character string conversion system as well as a character string conversion method for converting character strings on a network in which a server is connected to one or a plurality of clients, and a computer-readable recording medium with a program for making a computer execute the methods stored therein.

BACKGROUND OF THE INVENTION

A concrete example of a kana-to-kanji conversion system is disclosed in Japanese Patent Laid-Open Publication No. HEI 7-85025. According to this publication, there is disclosed a technology in which a character string inputted using a keyboard in the side of a client is displayed in kana on a CRT without transmission of the character string to a server. In this case, some application for converting the inputted character string in kana for obtaining a kana character string (a character string that comprises Roman letters and kana mixed therein and in which the kana has yet to be converted to a character string with Roman letters, kana and kanji mixed therein) is required in the side of the client, which causes a heavy load on the client side in the system.

To solve this problem, system configuration is conceivable in which the function of outputting a kana character string is allocated to the side of server and the function of displaying the kana character string sent from the server is allocated to the side of clients. FIG. 10 is a view for explaining the concept of a kana-to-kanji conversion system based on the conventional technology. As shown in FIG. 10, if a server 5 takes charge of the entire kana-to-kanji conversion including the processing for outputting a kana character string, a character string inputted in the side of a client 6 is transmitted to the server 5 as it is and is converted to kana character string in the server 5. The kana character string converted by the server 5 is returned to the client 6, and the kana character string sent from the server 5 is displayed in the client 5.

Taking a user interface into consideration, it is important that the response time, which a time elapsed when a user inputs a character string using the keyboard and the kana character string is displayed on the screen of a CRT, is short so that it does not cause stress to the user. If the response time is long or it is not constant, the rhythm of inputting characters is disturbed, and the user gets stressed. Accordingly, in recent years, there has been expected a proposal of a kana-to-kanji conversion system with which the problems as described above can be solved as quickly as possible.

SUMMARY OF THE INVENTION

It is an object of the present invention to obtain a kana-to-kanji conversion system, a character string conversion system, a kana-to-kanji conversion method, and a character string conversion method each in which a user interface can be improved by making a response to entry of a character string quicker and constant for the system, and also a computer-readable recording medium with a program for making a computer execute those methods stored therein.

With the present invention, in the side of a server, an input character string received from a client on the network is converted to a kana character string and the kana character string is transmitted to the originator client through the network, while, in the side of originator client, an input character string is displayed as well as transmitted to the server through the network, and then a kana character string is received from the server and is displayed, so that the input character string is displayed when it is being inputted, that is, the inputted character string is displayed before displaying of the kana character string sent from the server, and with this operation, a response to entry of a character string can be made quicker and constant from the system viewpoint, whereby a user interface can be improved.

With the present invention, the received kana character string is displayed after a specified period of time from entry of a character string has passed, so that an input character string and only the kana character string that has been received at a point of time are displayed, whereby it is possible for a user to check more easily what character string has been inputted with the help of displaying the input character string.

With the present invention, in the side of a client, when kana character string received from the serve is to be displayed, of the displayed input character strings, the display of a section corresponding to the received kana character string is displayed in a different form, so that, even if the kana character string corresponding to the input character string has not been completed, temporary display can be provided by combining the input character string with the kana character string, and with this operation, a response to entry of a character string can be made quicker and constant from the system viewpoint, whereby a user interface can be improved.

With the present invention, in the side of a server, Romaji data (Japanese language data written in Roman letters) or an instruction for conversion transmitted from a client through the network is accepted, the successively received Romaji data is converted to kana data, the converted kana data is successively stored and is also returned to the originator client; on the other hand, when an instruction for conversion is accepted, the kana data stored in the server is converted to a kanji character string (a character string that comprises kana and kanji mixed therein) according to the instruction for conversion, and the kanji character string is returned to the originator client, while, in the side of one or a plurality of clients, a character string comprising one or a plurality of characters is inputted one by one; also an instruction for conversion is inputted; Romaji indicating each character at each time when characters are inputted one by one is temporarily displayed and is also transmitted to the server through the network in the order in which the characters are inputted; and then, when the response with the kana data is successively received, a Romaji display section corresponding to the received kana data is changed to the kana character string; on the other hand, when the response with the kanji data is received after the instruction for conversion is issued, in the display result by kana, a kana display section corresponding to the received kanji data or a display section with kana and Romaji mixed therein is changed to a kanji character string based on the kanji data, so that Romaji is displayed when it is being inputted, i.e. the inputted character string is displayed before displaying of the kana sent from the server; the display is successively changed from Romaji to kana according to the response with kana converted from Romaji from the server; the display is changed from the kana to a kanji character string according to the response with kanji converted from kana from the server; and with the operations described above, a response to entry of a character string can be made quicker and constant from the system viewpoint, whereby a user interface can be improved.

With the present invention, a display of kana is started after a specified period of time from entry of Romaji has passed, so that input Romaji and only the kana that has been received at a point of time are displayed, whereby it is possible for a user to check more easily what character string has been inputted with the help of the displayed input Romaji.

With the present invention, in the side of server, kana-to-kanji conversion executed just after the Romaji-to-kana conversion is completed even if an instruction for conversion is not received from the client, so that a corresponding kana-to-kanji converted character string can instantly be returned to the client whenever an instruction for conversion is received from the client by making good use of the time after the kana conversion is completed until the instruction for conversion is received for kana-to-kanji conversion, whereby it is possible to improve a response to the request for kana-to-kanji conversion.

With the present invention, in the side of server, a plurality of candidates are kept ready for the previously kana-to-kanji converted character string, so that a character string having been subjected to kana-to-kanji conversion as a second candidate can instantly be returned to the client whenever an instruction for changing candidates is received from the client, whereby it is possible to improve a response to the request for kana-to-kanji conversion significantly.

With the present invention, when instructions for conversion are successively inputted for the same input character string, the plurality of candidates previously kept ready are switched and displayed, so that wastage of time while converting character strings one by one each time after receipt of an instruction for conversion can be eliminated, whereby it is possible to switch efficiently to any candidate in kanji character string for the same input character string.

With the present invention, an input character string is displayed in the order in which the characters are inputted in the side of the originator client on the network, the input character string is transmitted successively from the originator client to the server, a kana character string is obtained by converting the input character string successively in the server, the kana character string is transmitted from the server to the originator client, and the display of a section corresponding to the received kana character string of the input character strings is changed in the originator client, so that the input character string is displayed when it is being inputted, i.e. the input character string is displayed before displaying of the kana character string sent from the server, and with this operation, a response to entry of a character string can be made quicker and constant from the system viewpoint, whereby a user interface can be improved.

Other objects and features of this invention will become clear from the following description with reference to the accompanying drawings.

DESCRIPTION OF THE PREFERRED EMBODIMENTS

Detailed description is made hereinafter for a preferred embodiment according to the present invention with reference to the related drawings.

Figure 1:
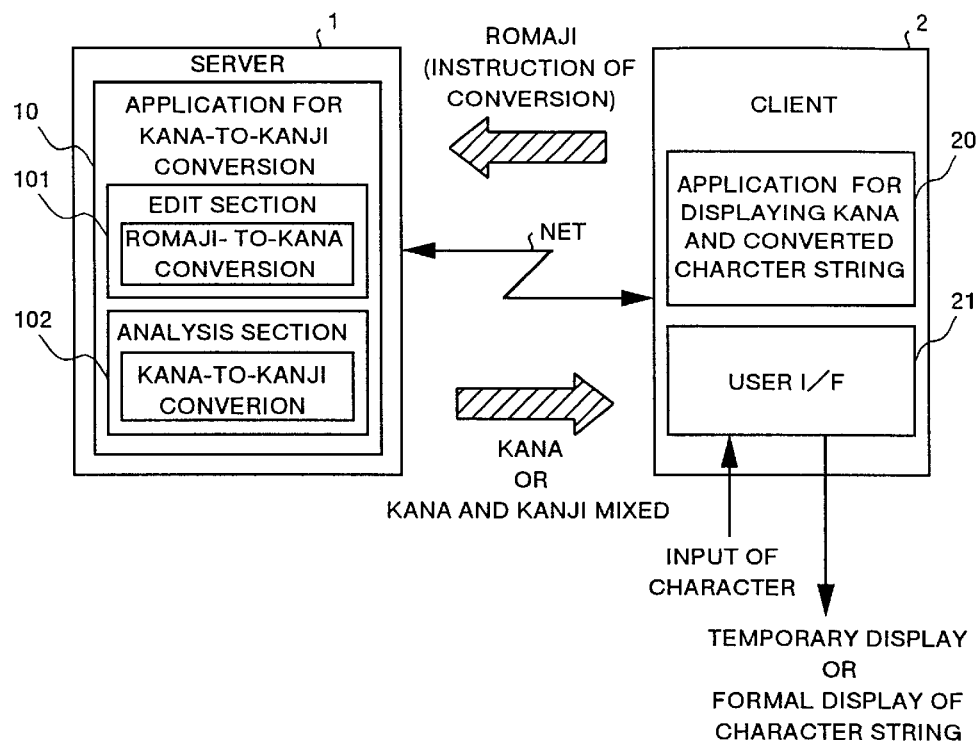
FIG. 1 is a block diagram showing schematically a kana-to-kanji conversion system according to an embodiment of the present invention.

At first, description is made for the system configuration. FIG. 1 is a block diagram showing schematically a kana-to-kanji conversion system according to an embodiment of the present invention. The kana-to-kanji conversion system shown in FIG. 1 has configuration in which a server 1 and one or a plurality of clients (described as a client 2 herein as a representative thereof) are connected to each other through a network NET. In this embodiment, a local area network (LAN) is applied for the network NET and kana-to-kanji conversion is executed on the network NET through which the server 1 and one or a plurality of clients are connected to each other.

The server 1 performs mainly a function of conversion according to an application 10 for kana-to-kanji conversion. This application 10 for kana-to-kanji conversion is a program which is divided into an edit section 101 and an analysis section 102. The edit section 101 mainly executes editing until kana-to-kanji conversion is instructed in the side of a originator client. This editing includes a conversion processing from Romaji to kana. The analysis section 102 mainly executes analysis processing when the kana-to-kanji conversion is instructed in the side of originator client. This analysis processing includes a conversion processing from kana to kanji.

The client 2 as a representative of one or a plurality of clients has mainly an application 20 for displaying a kana and converted character string and an user interface user I/F 21. This application 20 for displaying a kana and converted character string is a program for displaying a character string inputted using the user I/F 21, displaying Romaji when the characters are being inputted, temporarily displaying a kana character string; namely kana data obtained by being subjected to processing for outputting a kana character string in the server 1 by changing the Romaji display to the kana display, and formally displaying a kanji character string returned after an instruction for conversion (instruction for kana-to-kanji conversion) to the character string already having sent to the server 1 is issued by changing the temporary display to the display of the character string therewith.

Figure 2:
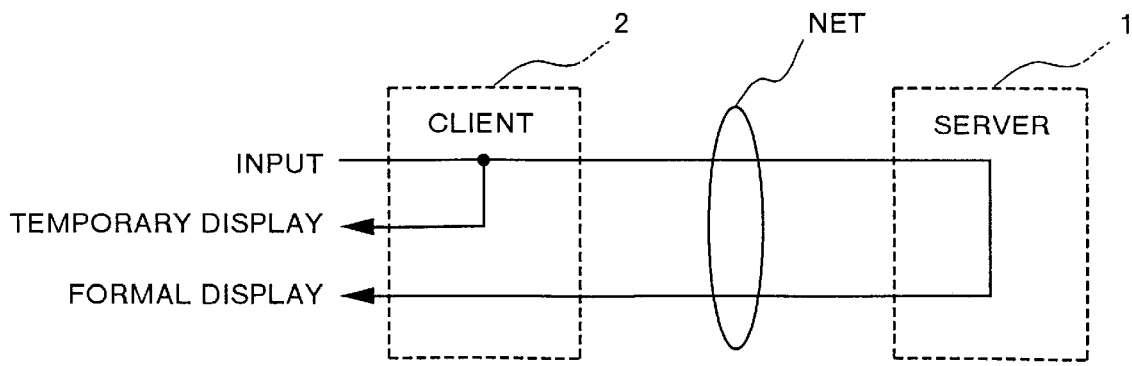
FIG. 2 is a view explaining conceptionally the kana-to-kanji conversion system according to the embodiment.

In the next, description is made for principles of the kana-to-kanji conversion system. FIG. 2 is a view for explaining conceptionally the kana-to-kanji conversion system according to the embodiment.

In the kana-to-kanji conversion system described above, the server 1 accepts Romaji data or an instruction for conversion transmitted from the originator client 2 through the network NET. The server 1 converts the successively accepted Romaji data to kana data, stores it as well as returns it to the originator client 2 through the network NET. On the other hand, when the server 1 accepts an instruction for conversion it converts the currently stored kana data to kanji data according to the instruction for conversion, and returns the kanji data is returned to the originator client 2.

In contrast, in the side of client 2, when each character in a character string comprising one or a plurality of characters is inputted one by one, Romaji indicating each character is temporarily displayed at each time when each character is inputted and is also transmitted to the server 1 through the network NET in the order in which the characters are inputted. Then, if kana data is successively returned from the server 1, a displayed section in Romaji corresponding to the returned kana is changed to the kana character string based on the kana data, and, on the other hand, when an instruction for conversion is sent to the server 1 through the network NET, and then, if kanji data is returned therefrom, for a temporary display, a displayed section in kana corresponding to the returned kanji data or a displayed section in kana and Romaji mixed therein is changed to the kanji character string based on the kanji data.

Namely, in the above operations described with reference to FIG. 2, the character string inputted in the side of client 2 is temporarily displayed in Romaji at a timing of input thereof and the Romaji data in which the character string is temporarily displayed is also sent to the server 1. The input character string in Romaji is temporarily displayed before the kana is received. The Romaji having transmitted from the client 2 to the server 1 is returned as the corresponding kana, so that a formal display is executed with the kana.

Figure 3:
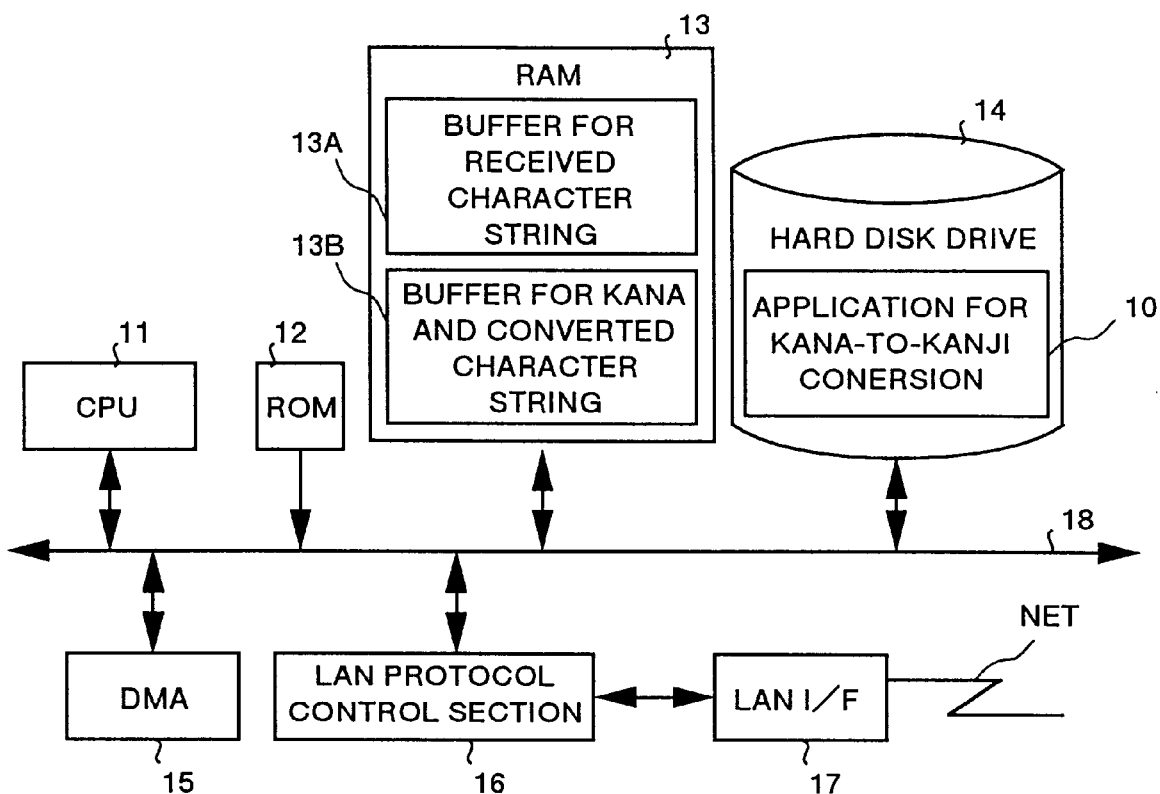
FIG. 3 is a block diagram showing internal configuration of a server according to the embodiment.

In the next, detailed description is made for the server 1 and the client 2 constituting the kana-to-kanji conversion system. At first, description is made for the server 1. FIG. 3 is a block diagram showing internal configuration of the server 1 according to the embodiment. The server 1 shown in FIG. 3 has such configuration that a CPU 11 thereof is connected to a bus 18 and is connected to units such as a ROM 12, a RAM 13, a hard disk drive 14, a DMA (Direct Memory Access) 15, a LAN protocol control section 16, and a LAN interface LAN I/F 17 through the bus 18.

The CPU 11 provides controls over operations of the entire server 1 according to various programs, parameters and a program such as an application 10 for kana-to-kanji conversion each stored in the ROM 12. This CPU 11 provides controls over read/write of data to a memory in each of the units and a protocol control on communications or the like.

The ROM 12 stores therein an operating system (OS) for operation of the CPU 11, programs (a program or the like according to the flow chart shown in FIG. 6), and various types of parameters or the like. The RAM 13 comprises a buffer 13A for a received character string, a buffer 13B for kana and converted character strings, and a work area for the CPU 11. The buffer 13A for received character strings is a buffer for accumulating therein character strings namely Romaji data requested from each client (e.g. client 2) for the conversion thereof. The buffer 13B for kana and converted character strings is a buffer for accumulating kana data obtained by converting the Romaji data accumulated in the buffer 13A for a received character string and also accumulating data comprising kanji character string in a range from the first candidate to the n-th candidate (n: a natural number) obtained by subjecting the kana data to kana-to-kanji conversion.

The hard disk drive 14 stores therein application programs such as the application 10 for kana-to-kanji conversion, accumulates data for transmission/reception and system data according to controls by the CPU 11, and reads out data for any program according to access from the CPU 11. The DMA 15 provides controls over data transmission between the hard disk drive 14 and the RAM 13 and between the hard disk drive 14 and the LAN protocol control section 16.

The LAN protocol control section 16 provides controls over the entire LAN communications in the server 1 and is connected to the network NET of the LAN through the LAN I/F 17. The LAN I/F 17 performs encoding and decoding of signals on the network NET.

Figure 4:
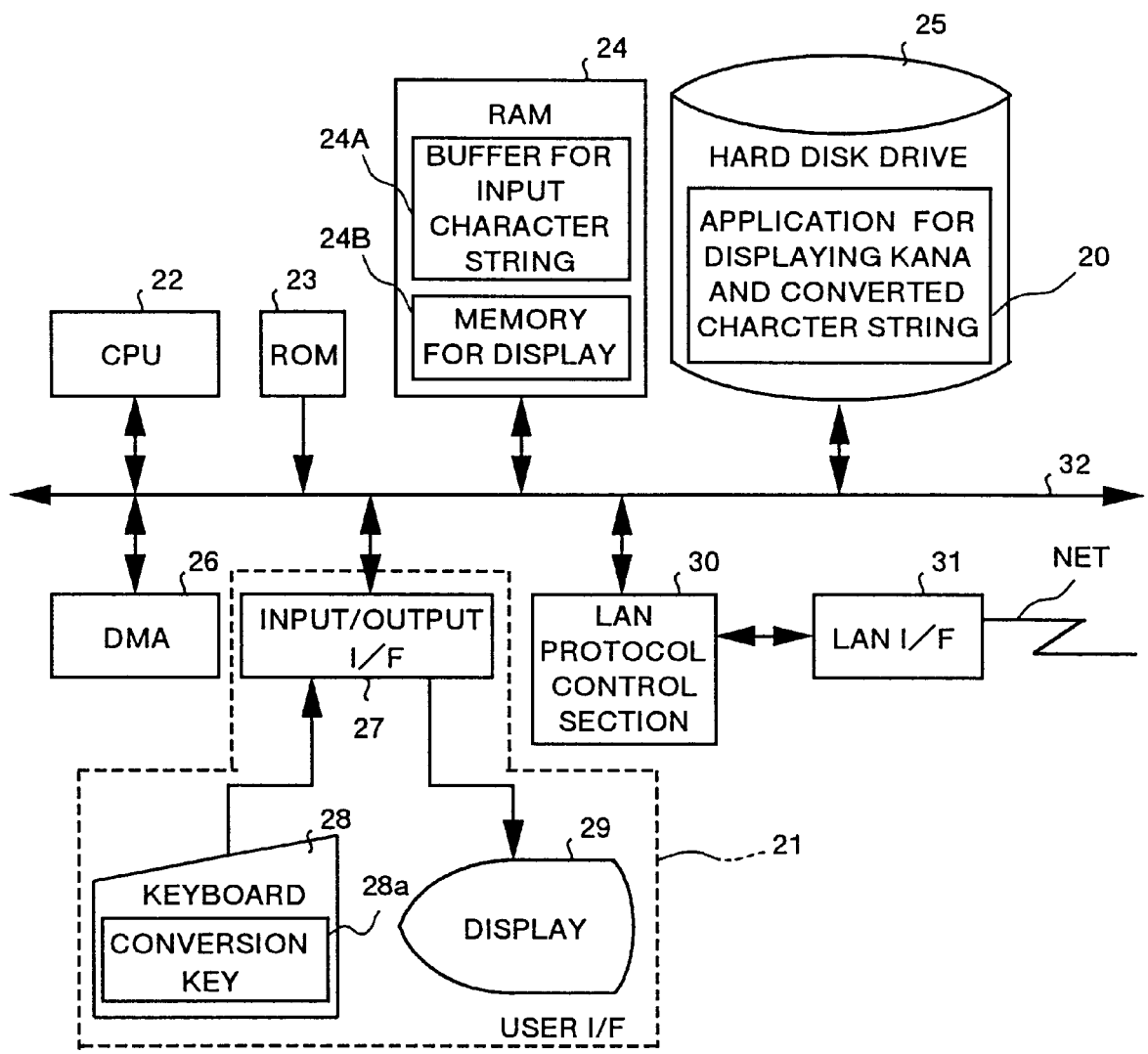
FIG. 4 is a block diagram showing internal configuration of a client according to the embodiment.

Hereafter, description is made for the client 2. FIG. 4 is a block diagram showing internal configuration of the client 2 according to the embodiment. In the client 2 as shown in FIG. 4 a CPU 22 is connected to a bus 32 and is connected to units such as a user I/F 21, a ROM 23, a RAM 24, a hard disk drive 25, a DMA 26, a LAN protocol control section 30, and a LAN I/F 31 through the bus 32.

The user I/F 21 comprises a keyboard 28 for inputting characters and commands and a display 29 for displaying the inputted data, each connected to the bus 32 through an input/output interface input/output I/F 27. The keyboard 28 has a conversion key 28a for instructing kana-to-kanji conversion or the like.

The CPU 22 provides controls over operations of the entire client 2 according to various programs, parameters and a program such as an application 20 for displaying kana and converted character string each stored in the ROM 23. This CPU 22 also provides controls over read/write of data to a memory in each of the units and a protocol control on communications or the like.

The ROM 23 stores therein an operating system (OS) for operation of the CPU 22, programs (a program or the like according to the flow chart shown in FIG. 5), and various types of parameters or the like. The RAM 24 comprises a buffer 24A for input character string, a memory for display 24B, and a work area for the CPU 22. The buffer 24A for input character strings is a buffer for accumulating therein character strings, namely Romaji data inputted using the keyboard 28. The memory for a display 24B is a memory for a temporary display for storing therein data for a display based on the data in Romaji accumulated in the buffer 24A for an input character string and kana data returned from the server 1, and is a memory for a formal display for storing kanji data returned from the server 1.

The hard disk drive 25 stores application programs such as the application 20 for displaying kana and converted character string, accumulates data for transmission/reception and system data according to controls by the CPU 22, and reads out data for any program according to access from the CPU 22. The DMA 26 provides controls over data transmission between the hard disk drive 25 and the RAM 24 and between the hard disk drive 25 and the LAN protocol control section 30.

The LAN protocol control section 30 provides controls over the entire LAN communications in the client 2 and is connected to the network NET of the LAN through the LAN I/F 31. The LAN I/F 31 performs encoding and decoding of signals on the network NET.

Figure 5:
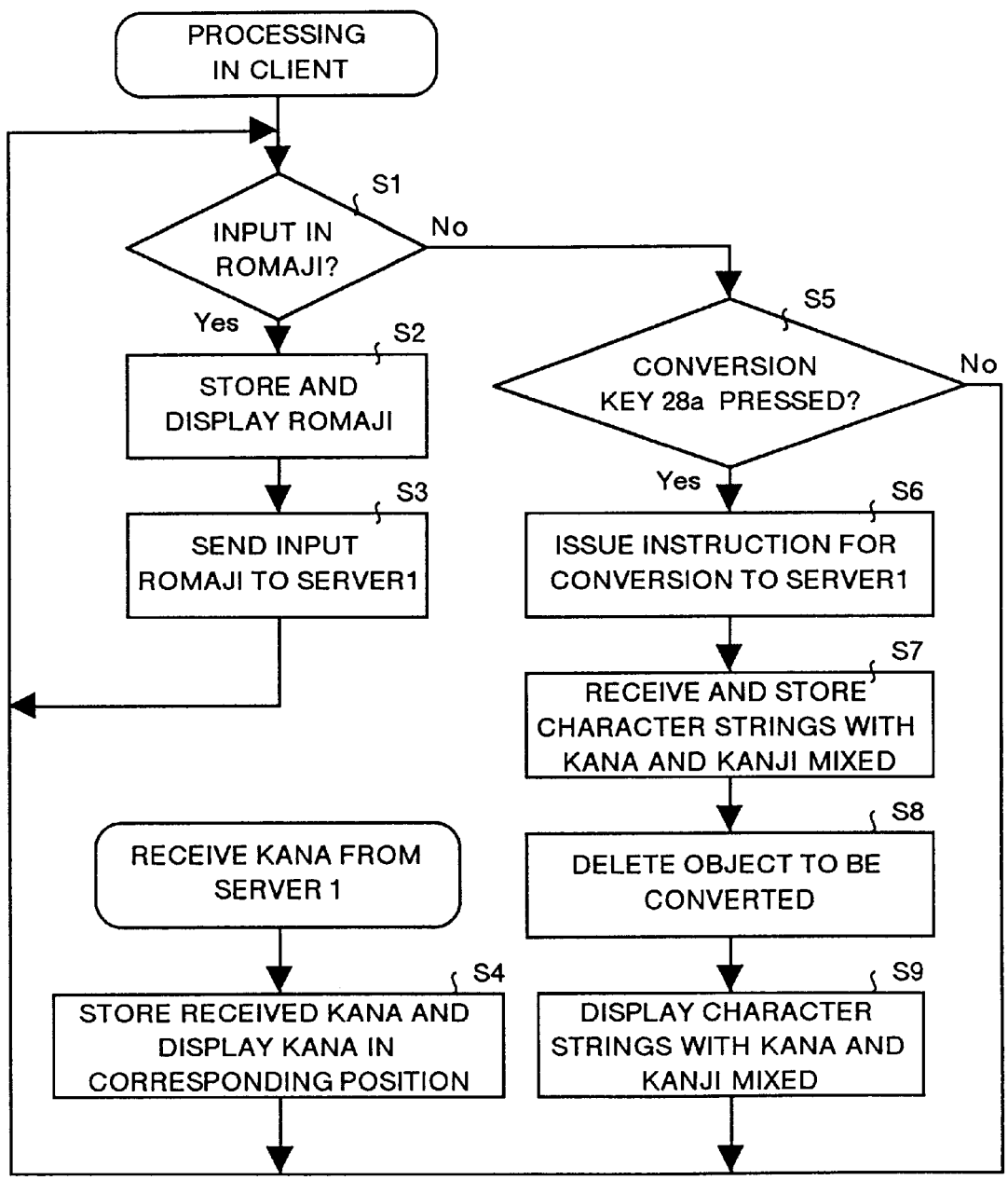
FIG. 5 is a flow chart for explaining the processing in the client according to the embodiment.
Figure 6:
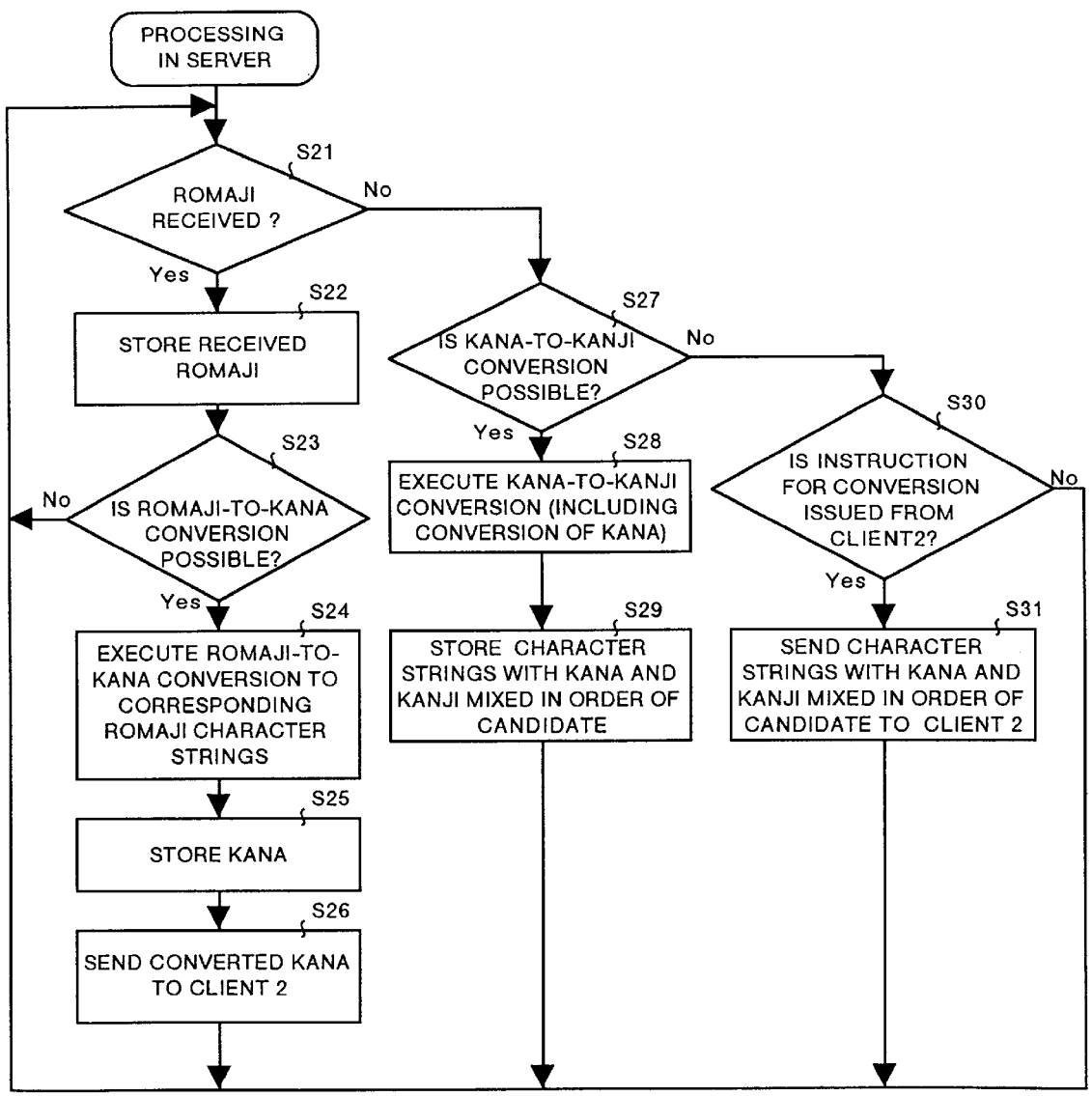
FIG. 6 is a flow chart for explaining the processing in the server according to the embodiment.
Figure 7:
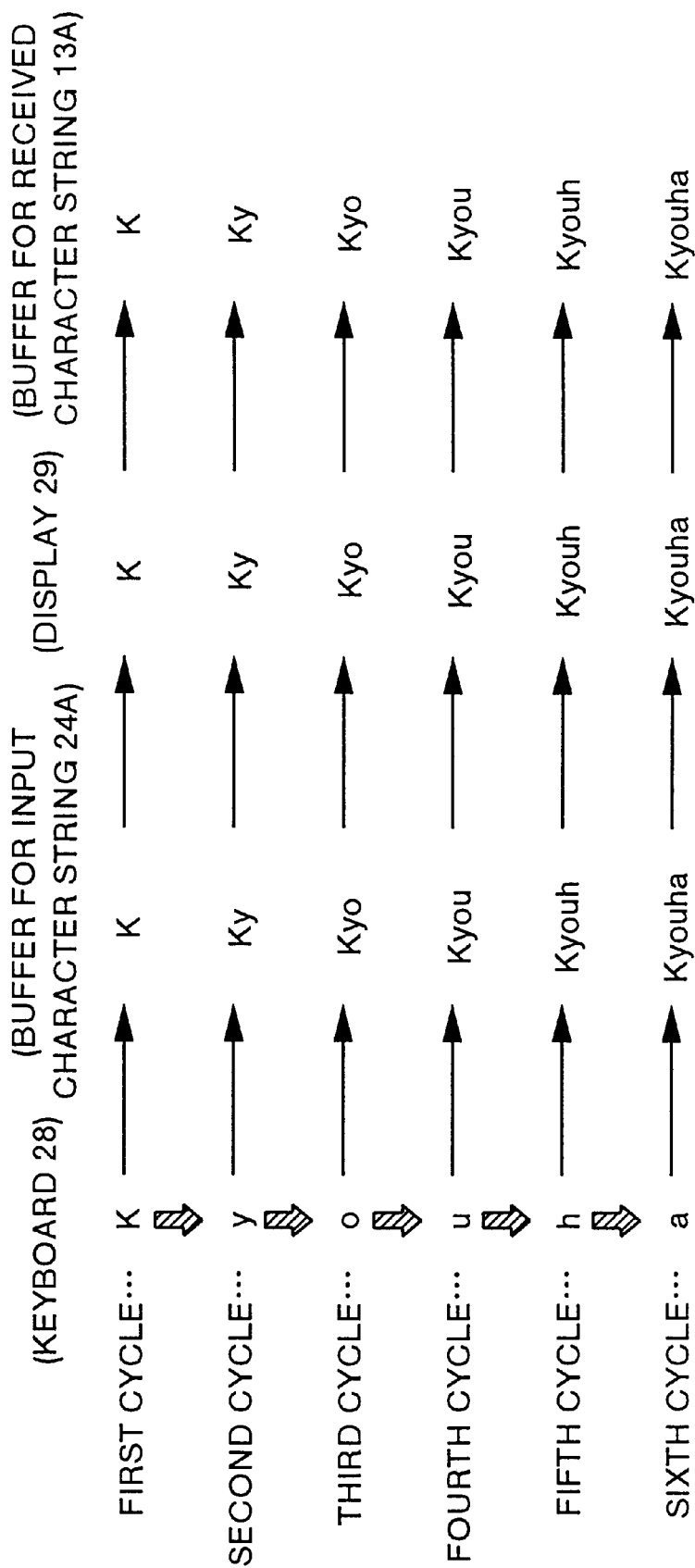
FIG. 7 is a view for explaining a user interface according to the embodiment.
Figure 8:
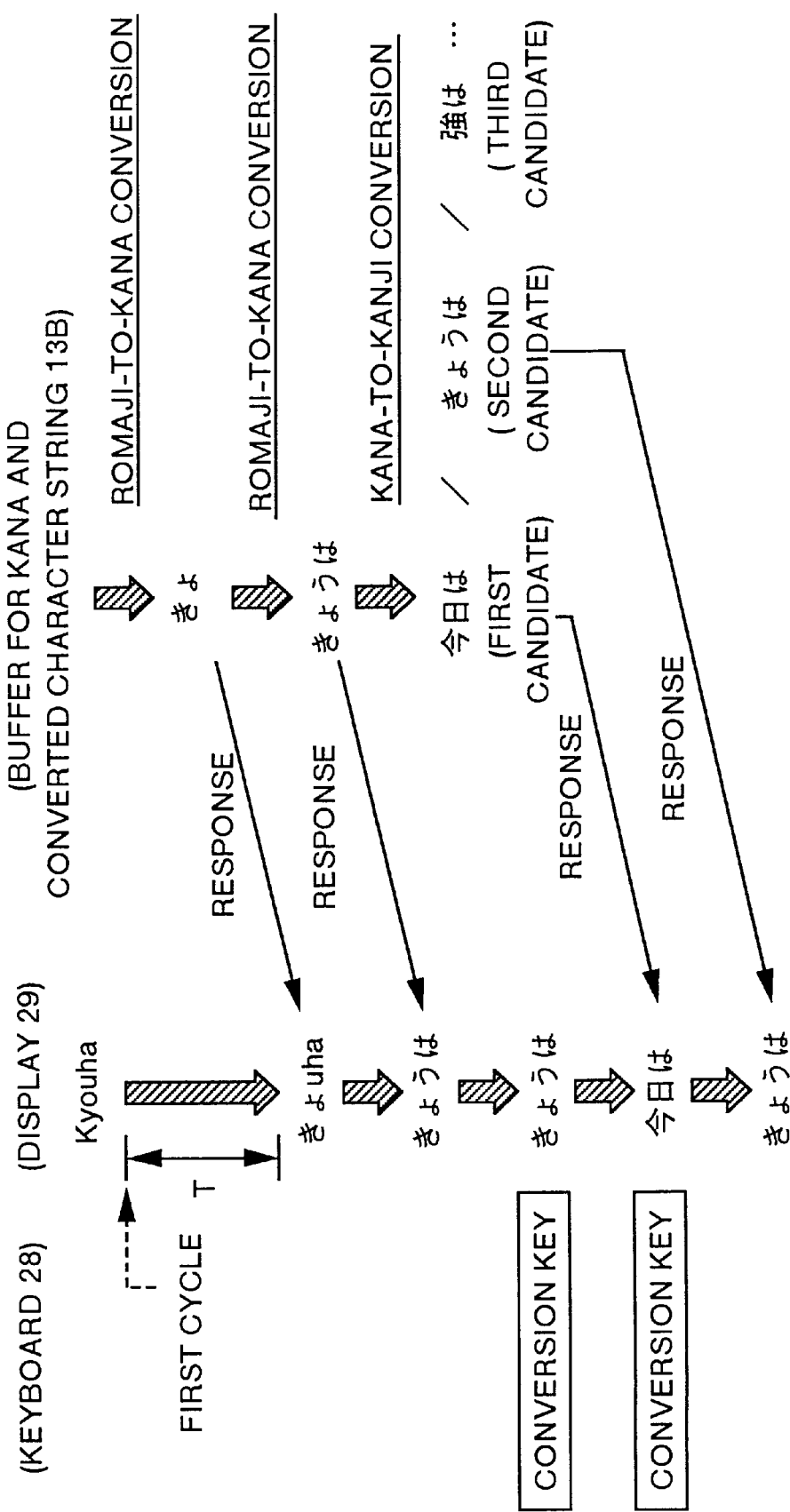
FIG. 8 is another view for explaining a user interface according to the embodiment.
Figure 9:
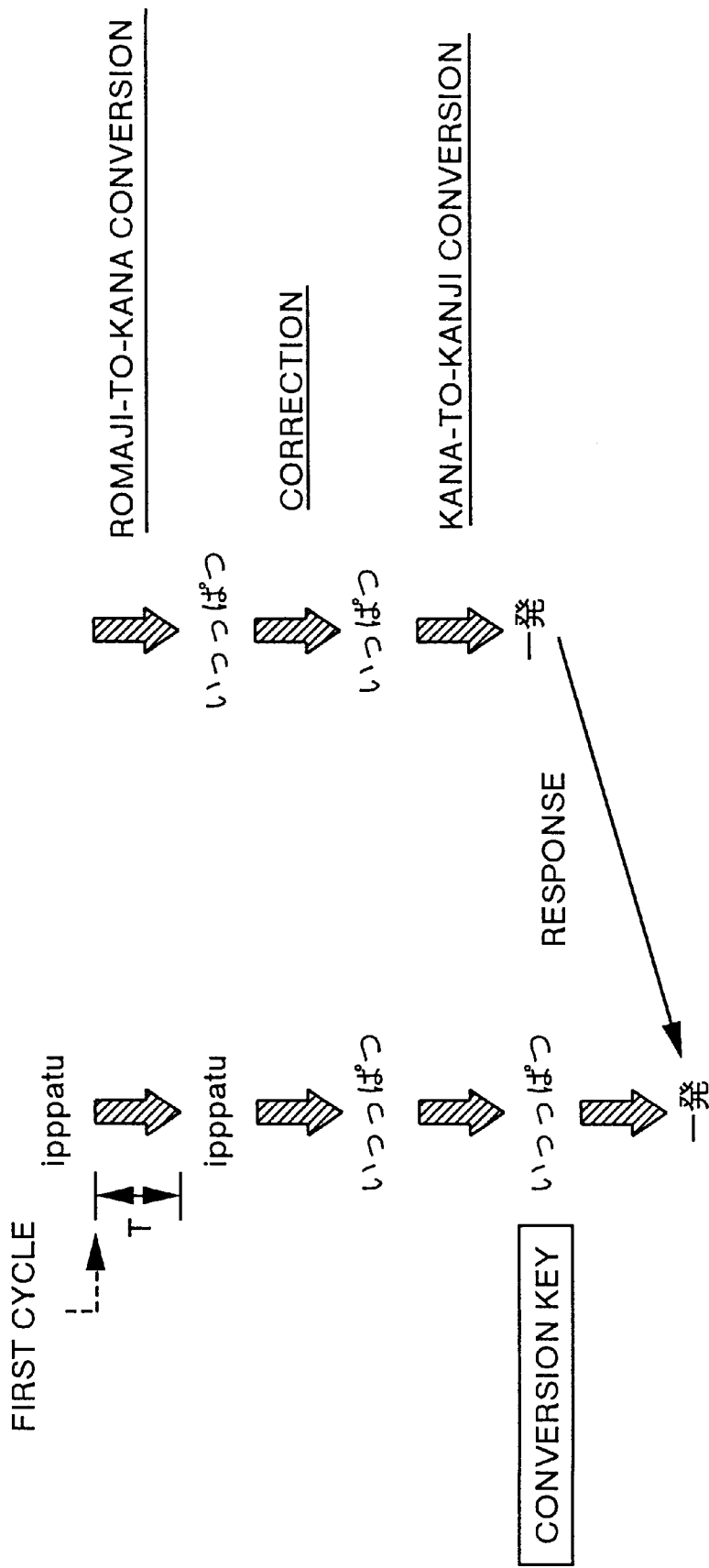
FIG. 9 is still another view for explaining a user interface according to the embodiment.
Figure 10:
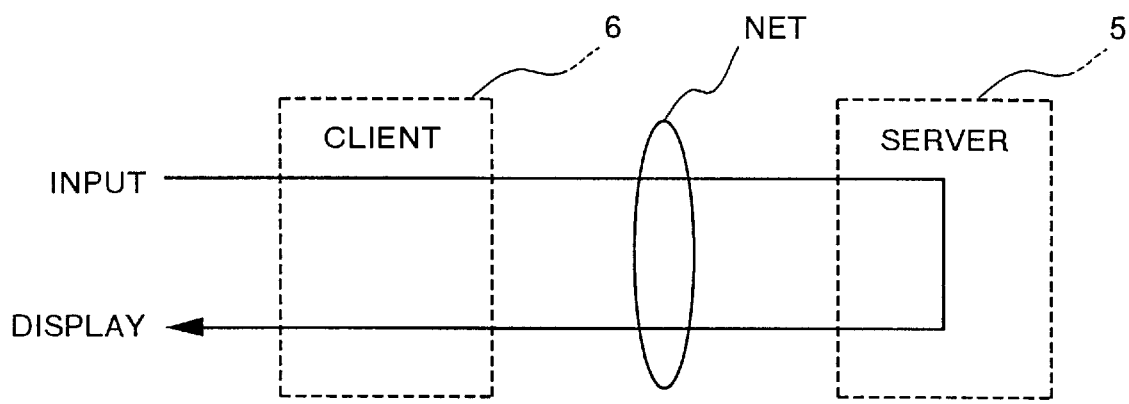
FIG. 10 is a view for explaining conceptionally a kana-to-kanji conversion system according to an example based on the conventional technology.

In the next, description is made for operations of the server 1 as well as of the client 2. FIG. 5 is a flow chart for explaining operations in the client according to the embodiment, FIG. 6 is a flow chart for explaining operations in the server according to the embodiment, and FIG. 7 to FIG. 9 are views for explaining a user interface according to the embodiment respectively.

Description is made hereinafter for operating steps as an example for entry of a character string "今日は" (pronounced: kyouha, meaning: today) using the keyboard 28 to display thereof on a display 29. When the character string "今日は" is inputted using the keyboard 28, as Romaji data corresponding to the character string "今日は", the data for the corresponding Romaji is successively generated at six cycles of inputting the Roman letters "k", "y", "o", "u", "h", "a" (refer to FIG. 7). This data is stored in the buffer 24A for input character strings.

When the Romaji "k" is inputted in a first cycle (step S1), the data for Romaji "k" is stored in the buffer 24A for input character strings, and data for a display based on the data for Romaji "k" is stored in the memory for a display 24B. For this reason, in the side of client 2, the input character "k" is temporarily displayed on the display 29 before the conversion thereof to kana (step S2).

The data for Romaji "k" inputted in the first cycle is not only stored in the buffer 24A for input character strings but also transmitted to the server 1 through the network NET (step S3). With this transmission, the data for Romaji "k" is received by the server 1 (step S21) and stored in the buffer 13A for received character strings (step S22). The data for Romaji "k" accepted by the server 1 is accumulated in the buffer 13A for received character strings as a first character for Romaji-to-kana conversion. In the side of server 1, the Romaji-to-kana conversion is not yet possible at this stage (step S23), then system control returns to step S21.

When characters are inputted in the order of the Romaji "y", "o", "u", "h", "a" in the second to sixth cycles (refer to FIG. 7), inputted Romaji data is accumulated in the buffer 24A for input character strings in the side of client 2 as well as in the buffer 13A for received character strings in the side of server 1 in the order in which the characters are inputted, and then the Romaji is displayed on the display 29. Namely, display in the order of the Romaji "k", "y", "o", "u", "h", "a" is provided on the screen of the display 29 according to the input order of the Romaji "k", "y", "o", "u", "h", "a".

As for kana-display, a kana character string returned from the server 1 after a specified time from entry of the first character (Romaji "k") in the first cycle is passed is displayed. Namely, even if a character is inputted in the client 2, the client 2 can not instantly display corresponding kana until the converted kana is returned from the server 1, so that the client 2 necessarily deals with the above matter by the temporary display until the response is returned through the network NET. For this reason, there is sometimes a case where only Romaji "kyouha" is displayed on the display 29 as shown in FIG. 8 even at the point of time when entry of the character string is ended.

Assuming that the specified time is T, as shown in FIG. 8, kana based on the kana data returned from the server 1 is displayed after the specified time T counted from the first cycle has passed. The kana "きょ" (pronounced: kyo) obtained through Romaji-to-kana conversion at the point of time when the specified time T has passed in the server 1 is derived from the Romaji "kyo" received in cycles from the first cycle to the third cycle. Namely, in the side of server 1, it is determined that the Romaji-to-kana conversion can be executed when the Romaji "k" "y" "o" have been accumulated in the buffer 13A for received character strings (step S23), and the Romaji-to-kana conversion from the Romaji "kyo" to the corresponding kana "きょ" is executed (step S24).

The kana character string "きょ" obtained as described above is stored in the buffer 13B for kana and converted character strings (step S25). Then the kana character string "きょ" is returned to the client 2 through the network NET (step S26). At this point of time, the Romaji-to-kana conversion for the Romaji "uha" has not been completed yet in the server 1. In the client 2, when the data for the kana "きょ" is received from the server 1 as the response, data for a display is prepared based on the data for the kana "きょ" to be stored in the memory 24B for a display. Then, in order to reflect a result of the response onto the display 29, of the Romaji "kyouha" currently displayed on the display 29, the Romaji "kyo" corresponding to the kana "きょ" is deleted and the kana "きょ" is displayed instead. As a result, the character string with Romaji and kana mixed therein "きょuha" is displayed on the display 29 (step S4).

Then, in the server 1, when Romaji "u" is converted to kana "う" (pronounced: u) and further Romaji "ha" is converted to kana "は" (pronounced: ha), the kana "う" and "は" are successively returned to the client 2. As a result, as shown in FIG. 8, the kana "きょうは" (pronounced: kyouha, meaning: today) is displayed on the display 29, which shows that the client 2 has the kana character string for the input character string.

In the server 1, when all the steps of Romaji-to-kana conversion are completed and it is determined that kana-to-kanji conversion can be executed to the string (step S27), kana-to-kanji conversion is executed thereto based on the kana data "きょうは" which the server 1 currently has, by making use of a spare time until the instruction for kana-to-kanji conversion is received from the client 2 (step S28). A plurality of candidates obtained by the conversion are stored in the buffer 13B for kana and converted character strings in the order of preference thereof (step S29). Namely, a kanji character string corresponding to the kana "きょうは" has some candidates, for instance, "今日は" (comprising kanji and kana, pronounced: kyouha, meaning: today) as the first candidate, "きょうは" (comprising kana only, pronounced: kyouha meaning: today or may have some other meanings) as the second candidate, and "強は" (comprising kanji and kana, pronounced: kyouha and has no meaning) as the third candidate.

When the conversion key 28a is operated in the side of client 2 (step S5), an instruction for conversion thereof is issued from the client 2 to the server 1 (step S6), and the conversion instruction is accepted by the server 1 (step S30). The sever 1 returns the data comprising kanji character string "今日は" as the first candidate in response to the instruction for the conversion (step S31). The client 2 prepares, when having received the data comprising character strings therewith "今日は", display data based on the received data and stores it in the memory 24B for display (step S7). Then, the kana "きょうは" currently displayed on the display 29 is deleted (step S8), and the display is changed to the kanji character string "今日は" (step S9).

When the first candidate of kanji character string "今日は" has been displayed and if the conversion key 28a is operated once again in the side of client 2 (step S5), the instruction for conversion is again issued to the server 1 (step S6). When this instruction for conversion is accepted by the server 1 (step S30), it is determined by the server 1 that the instruction is for changing to some other candidates to be displayed for the same input character string, so that the second candidate of kanji character string "きょうは" currently stored in the buffer 13B for kana and converted character strings is read out to be returned to the originator (step S31).

Namely, after the first candidate of kanji character has been displayed in the client 2, an instruction for the conversion is send to the server 1 by pressing the conversion key 28a. The server 1 takes this as an instruction for changing to some other candidate. At that time, the candidate is changed to an another candidate in the ascending order thereof.

It is assumed that the character string described above is inputted with correct spelling of "kyouha", but there is sometimes a case where an input character string namely spelling thereof in Romaji may be incorrect. In this case, in the server 1, even if incorrect kana-spelling is received due to incorrect Romaji input, the error can be corrected.

The next, description is made for a case where characters for displaying a character string of, for instance, "一発" (comprising kanji only, pronounced: ippatu, meaning: a (single) shot) are to be inputted in the client 2, but the spelling thereof is erroneously inputted as "ipppatu" with reference to FIG. 9. It is assumed that Romaji "ipppatu" is displayed on the display 29 due to incorrect input of the character string in the client 2 and Romaji to kana conversion has not been completed yet in the server 1 at the point of time when a specified time T from the first cycle has passed.

Then, when Romaji to kana conversion is executed based on the Romaji "ipppatu" accumulated in the buffer 13A for received character strings in the server 1, kana "いっっぱつ" (pronounced: ipppatu) is obtained as it is, then the kana "いっっぱつ" is displayed on the display 29 through the response from the server 1 to the client 2. The display is kept as the kana "いっっぱつ" until kana to kanji conversion is executed because information for the correction to the display of the incorrectly spelled kana will never be sent from the server 1.

In contrast, in the server 1 (refer to FIG. 6), when kana-to-kanji conversion is ready to be executed to the character string (step S27), the kana-to-kanji conversion is performed based on the data for the kana "いっっぱつ" (pronounced "ipppatu") stored in the buffer 13B for kana and converted character strings, but the kana "いっっぱつ" is incorrectly spelled, so that the kana "いっっぱつ" is corrected to kana "いっぱつ" (pronounced: ippatu). Accordingly, the kana-to-kanji conversion is executed, as shown in FIG. 9, based on the data for the kana "いっぱつ". Namely, the first candidate of kanji character string "一発" is obtained to be stored in the buffer 13B for kana and converted character strings.

Then, when an instruction for conversion is issued from the client 2 to the server 1, the data for the first candidate thereof "一発" stored in the buffer 13B for kana and converted character strings is read out and returned to the originator client 2. In the side of client 2, as shown in FIG. 9, the kana "いっっぱつ" is changed to the first candidate thereof "一発" on the display based on the data for the first candidate thereof "一発".

As described above, with the embodiment, in the side of client 2, Romaji is displayed at a timing of inputting a character before displaying of kana sent from the server 1, the display is successively changed from Romaji to kana according to the response of kana conversion from the server 1, and the display is changed from the kana to a kanji character string according to the response with a kana-to-kanji converted character string from the server 1, and with those operations, a response to an entry of a character string can be made quicker and constant from the system viewpoint, whereby a user interface can be improved.

kana display is programmed to be started after a specified time from entry of Romaji has passed, so that inputted Romaji is displayed and also only kana that can be received at the point of time is displayed, whereby it is possible for a user to check more easily what character string has been inputted with the help of displaying the input Romaji.

In the side of server 1, kana-to-kanji conversion is started when all the steps of Romaji-to-kana conversion are completed, so that when an instruction for conversion is accepted from the client 2, a corresponding kana-to-kanji converted character string can instantly be returned to the client 2 by making good use of the time after the kana conversion is completed until the instruction for conversion is reached for kana-to-kanji conversion, whereby it is possible to improve a response to the request for kana-to-kanji conversion.

In the side of server 1, a plurality of candidates are kept ready for the previously kana-to-kanji converted character string, so that a kana-to-kanji converted character string as a second candidate can instantly be returned to the client 2 whenever the instruction for changing the candidate is received from the client 2, whereby it is possible to improve a response to the request for kana-to-kanji conversion significantly.

If instructions for conversion to the same input character string are successively issued from the client 2 to the server 1, the plurality of candidates kept ready in the server 1 are switched and displayed in the client 2, wastage of time while converting character strings one by one each time after receipt of an instruction for conversion can be eliminated, whereby it is possible to switch efficiently to any candidate in kanji character string for the same input character string.

As described above, with this invention, in the server, a character string inputted from a client on the network is converted to a kana character string and the kana character string is transmitted to the originator client through the network, while in the side of the originator client, an input character string displayed as well as transmitted to the server through the network, and then a kana character string is received from the server to be displayed, so that the input character string is displayed when it is being inputted, that is, the inputted character string is displayed before displaying of the kana character string sent from the server, and with this operation, it is possible to obtain a kana-to-kanji conversion system in which a response to entry of a character string can be made quicker and constant from the system viewpoint and a user interface can be improved.

With this invention, the received kana character string is displayed after a specified period of time from entry of a character string has passed, so that an input character string and also only the kana character string that has been received at a point of time are displayed, whereby it is possible to obtain a kana-to-kanji conversion system in which a user can check more easily what character string has been inputted with the help of displaying the input character string.

With this invention, in the side of a client, when a kana character string received from the server is to be displayed, of the displayed input character strings, the display of a section corresponding to the received kana character string is changed, so that, even if the kana character string corresponding to the input character string has not been completed, temporary display can be provided by combining the input character string with the kana character string, and with this operation, it is possible to obtain a kana-to-kanji conversion system in which a response to entry of a character string can be made quicker and constant from the system viewpoint and a user interface can be improved.

With this invention, in the side of the server, Romaji data or an instruction for conversion transmitted from a client through the network is accepted, the successively received Romaji data is converted to kana data, the converted kana data is successively stored and is also successively returned to the originator client, and on the other hand, when an instruction for conversion is accepted, the kana data stored in the storage is converted to data comprising kanji character string according to the instruction for conversion, and the data comprising kanji character string is returned to the originator client, while in one or a plurality of clients, a character string comprising one or a plurality of characters is inputted one by one, also an instruction for conversion is inputted, Romaji indicating each character at each time when characters are inputted one by one is temporarily displayed and is also transmitted to the server through the network in the order in which the characters are inputted, and then, when the response with the kana data is successively received, a Romaji display section corresponding to the received kana data is changed to the kana character string based on the kana data, on the other hand, when the response with the kanji data is received after the instruction for conversion is issued, in the display result by kana, a kana display section corresponding to the received kanji data or a display section with kana and Romaji mixed therein is changed to a kanji character string based on the kanji data, so that Romaji is displayed when it is being inputted, i.e. the inputted character string is displayed before displaying of the kana sent from the server, the display is successively changed from the Romaji to kana according to the response with kana converted from Romaji from the server, the display is changed from the kana to kanji character string according to the response with kanji converted from kana from the server, and with the operations, it is possible to obtain a kana-to-kanji conversion system in which a response to entry of a character string can be made quicker and constant from the system viewpoint and a user interface can be improved.

With this invention, a display of kana is started after a specified period of time from entry of Romaji has passed, so that input Romaji and only the kana that has been received at a point of time is displayed, whereby it is possible to obtain a kana-to-kanji conversion system in which a user can check more easily what character string has been inputted with the help of displaying the input Romaji.

With this invention, in the side of a server, kana-to-kanji conversion is executed just after the Romaji-to-kana conversion is completed even if an instruction for conversion is not received from the client, so that a corresponding kana-to-kanji converted character string can instantly be returned to the client whenever the instruction for conversion is received from the client by making good use of the time after the kana conversion is completed until the instruction for conversion is received for kana-to-kanji conversion, whereby it is possible to obtain a kana-to-kanji conversion system in which a response to the request for kana-to-kanji conversion can be improved.

With this invention, in the side of a server, a plurality of candidates are kept ready for the previously kana-to-kanji converted character string, so that a kana-to-kanji converted character string as a second candidate can instantly be returned to the client whenever the instruction for changing candidates is received from the client, whereby it is possible to obtain a kana-to-kanji conversion system in which a response to the request for kana-to-kanji conversion can be improved significantly.

With this invention, when plurality of instructions for conversion are successively inputted for the same input character string, the plurality of candidates previously kept ready are switched and displayed, so that wastage of time when converting character strings one by one each time after receipt of an instruction for conversion can be eliminated, whereby it is possible to obtain a kana-to-kanji conversion system in which any candidate in kanji character string can efficiently be switched to for the same input character string.

With this invention, in the side of a server, a character string inputted from a client on the network is converted to a kana character string and the kana character string is transmitted to the originator client through the network, while in side of the originator client, an input character string is transmitted to the server through the network, and then a kana character string is received from the server and displayed, so that the input character string is displayed when it is being inputted, that is, the inputted character string is displayed before displaying of the kana character string sent from the server, and with this operation, it is possible to obtain a character string conversion system in which a response to entry of a character string can be made quicker and constant from the system viewpoint and a user interface can be improved.

With this invention, an input character string is displayed in the order in which the characters are inputted in a client on the network, the input character are transmitted in the order in which the characters are inputted from the client to the server, a kana character string is obtained by processing the input characters successively transmitted in the server, the kana character string is transmitted from the server to the originator client, and the display of a section corresponding to the kana character string out of the input character strings is changed in the originator client, so that the input character string is displayed when it is being inputted, i.e. the inputted character string is displayed before displaying of the kana character string sent from the server, and with this operation, it is possible to obtain a kana-to-kanji conversion method in which a response to entry of a character string can be made quicker and constant from the system viewpoint and a user interface can be improved.

With this invention, an input character string is displayed in the order in which the characters are inputted in a client on the network, the input characters are transmitted in the order in which the characters are inputted from the client to the server, a kana character string is obtained by processing the input characters successively transmitted in the server, the kana character string is transmitted from the server to the originator client, and the display of a section corresponding to the kana character string out of the input character strings is changed in the originator client, so that the input character string is displayed when it is being inputted, i.e. the inputted character string is displayed before displaying of the kana character string sent from the server, and with this operation, it is possible to obtain a character string conversion method in which a response to entry of a character string can be made quicker and constant from the system viewpoint and a user interface can be improved.

With this invention, by recording a program for making a computer execute the above mentioned methods, the program is machine-readable, whereby it is possible to obtain recording medium with which the operations to execute the methods can be realized by a computer.

This application is based on Japanese patent application No. HEI 9-179628 filed in the Japanese Patent Office on Jul. 4, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A kana-to-kanji conversion system for converting kana to kanji on a network in which a server is connected to at least one client; wherein
said server comprising:
a receiving unit for receiving an input character string transmitted from a client on said network;
a kana character string processing unit for converting said input character string received by said receiving unit to a kana character string; and
a transmitting unit for transmitting said kana character string to the originator client through said network; wherein
said client comprising:
a transmitting/receiving unit for transmitting an input character string to said server and receiving said kana character string from said server through said network;
a display for displaying the input character string and for displaying the kana character string received by said transmitting/receiving unit.

2. A kana-to-kanji conversion system according to claim 1; wherein said display displays the kana character string received by said transmitting/receiving unit after a specified period of time from entry of a character string has passed.

3. A kana-to-kanji conversion system according to claim 2; wherein said display changes, when the kana character string received by said transmitting/receiving unit is to be displayed, display of a section corresponding to said received kana character string of the input character string.

4. A kana-to-kanji conversion system according to claim 1; wherein said display changes, when the kana character string received by said transmitting/receiving unit is to be displayed, display of a section corresponding to said received kana character string of the input character string.

5. A kana-to-kanji conversion system for converting kana to kanji on a network in which a server is connected to at least one client; wherein
said server comprising:
an accepting unit for accepting Romaji data or an instruction for conversion transmitted from a client on said network;
a Romaji-to-kana conversion unit for converting, when Romaji data is successively received by said accepting unit, the successively received Romaji data to kana data;
a storing unit for successively storing said kana data obtained by said Romaji-to-kana conversion unit;
a first responding unit for successively returning the kana data successively stored in said storing unit to the originator client;
a kana-to-kanji conversion unit for converting, when an instruction for conversion is accepted by said accept-
ing unit, the kana data stored in said storing unit to kanji data comprising kana and kanji characters according to the instruction for conversion; and
a second responding unit for returning the kanji data obtained by said kana-to-kanji conversion unit to said originator client; wherein
said client comprising:
an inputting unit for inputting a character string comprising one or a plurality of characters one by one and also inputting said instruction for conversion;
a temporary display for temporarily displaying Romaji indicating each character at each time when characters are inputted through said inputting unit one by one;
a kana display for transmitting the Romaji data temporarily displayed by said temporary display to said server through said network In the Input order of each characters, and for changing, when the response with said kana data is successively received from said first responding unit, the display of a Romaji display section corresponding to the kana to the kana based on said kana data; and
a kana/kanji display for changing, when the response with said kanji data is received from said second responding unit after the instruction for conversion is issued through said inputting unit, in the display result by said kana display, the display of a kana display section corresponding to the kanji character string or of a display section with kana and Romaji mixed therein to a kanji character string based on said kanji data.

6. A kana-to-kanji conversion system according to claim 5; wherein said kana display starts the display of kana after a specified period of time from entry of Romaji has passed.

7. A kana-to-kanji conversion system according to claim 6; wherein said kana-to-kanji conversion unit previously executes kana-to-kanji conversion from the time when the conversion by said Romaji-to-kana conversion unit is completed to the time when an instruction for conversion is accepted by said accepting unit.

8. A kana-to-kanji conversion system according to claim 7; wherein said kana-to-kanji conversion unit prepares a plurality of candidates for the previously executed kana-to-kanji conversion.

9. A kana-to-kanji conversion system according to claim 8; wherein said kana/kanji display displays, when a plurality of instructions for conversion are successively inputted for the same input character string through said inputting unit, by switching to the plurality of candidates previously prepared by said kana-to-kanji conversion unit.

10. A kana-to-kanji conversion system according to claim 5; wherein said kana-to-kanji conversion unit previously executes kana-to-kanji conversion from the time when the conversion by said Romaji-to-kana conversion unit is completed to the time when an instruction for conversion is accepted by said accepting unit.

11. A kana-to-kanji conversion system according to claim 10; wherein said kana-to-kanji conversion unit prepares a plurality of candidates for the previously executed kana-to-kanji conversion.

12. A kana-to-kanji conversion system according to claim 11; wherein said kana/kanji display displays, when a plurality of instructions for conversion are successively inputted for the same input character string through said inputting unit, by switching to the plurality of candidates previously prepared by said kana-to-kanji conversion unit.

13. A character string conversion system for converting a character string on a network in which a server is connected to at least one client; wherein said server comprising:
- a receiving unit for receiving a character string inputted from a client on said network;
- a kana character string processing unit for converting said input character string received by said receiving unit kana character string; and
- a transmitting unit for transmitting said kana character string to said originator client through said network; wherein said client comprising:
- a transmitting/receiving unit for transmitting an input character string to said server and receiving said kana character string obtained by said kana character string processing unit from said server through said network;
- a display for displaying the input character string and for displaying the kana character string received by said transmitting/receiving unit.

14. A kana-to-kanji conversion method for converting kana to kanji on a network in which a server is connected to at least one client; said method comprising:
- a first step of displaying an input character string in the order in which the characters are inputted in a client on said network;
- a second step of transmitting said input character string successively from said client to said server;
- a third step of obtaining a kana character string by processing the input character string successively transmitted in said second step in said server;
- a fourth step of transmitting the kana character string obtained in said third step from said server to the originator client; and
- a fifth step of changing the display of a section corresponding to the kana character string transmitted in said fourth step out of the input character strings displayed in said first step in said originator client.

15. A computer-readable recording medium with a program for making a computer execute the method according to claim 14 stored therein.

16. A character string conversion method for converting a character string on a network in which a server is connected to at least one client; said method comprising:
- a first step of displaying an input character string in the order in which the characters are inputted in a client on said network;
- a second step of transmitting said input character string successively from said client as an originator to said server;
- a third step of obtaining a kana character string by processing the input character string successively transmitted in said second step in said server;
- a fourth step of transmitting the kana character string obtained in said third step from said server to the originator client; and
- a fifth step of changing the display of a section corresponding to the kana character string transmitted in said fourth step out of the input character strings displayed in said first step in said client as an originator.

17. A computer-readable recording medium with a program for making a computer execute the method according to claim 15 stored therein.

* * * * *